United States Patent [19]
Tsuji

[11] Patent Number: 5,933,333
[45] Date of Patent: Aug. 3, 1999

[54] SWITCHING POWER SUPPLY APPARATUS

[75] Inventor: Hitoshi Tsuji, Sagamihara, Japan

[73] Assignee: Murata Manufacturing Co., Ltd., Japan

[21] Appl. No.: 08/921,227

[22] Filed: Aug. 27, 1997

[30] Foreign Application Priority Data

Aug. 30, 1996 [JP] Japan .................................. 8-249011

[51] Int. Cl.$^6$ ............................ H02M 3/335; H02M 5/42
[52] U.S. Cl. .................................. 363/21; 363/89; 363/97
[58] Field of Search ................................ 363/21, 89, 95, 363/97; 323/301

[56] References Cited

U.S. PATENT DOCUMENTS

| | | | |
|---|---|---|---|
| 4,274,132 | 6/1981 | Molyneux-Berry | 363/21 |
| 5,331,534 | 7/1994 | Suzuki et al. | 363/20 |
| 5,369,307 | 11/1994 | Kobayashi . | |

FOREIGN PATENT DOCUMENTS 3538694   5/1987   Germany .

*Primary Examiner*—Peter S. Wong
*Assistant Examiner*—Rajnikant B. Patel
*Attorney, Agent, or Firm*—Ostrolenk, Faber, Gerb & Soffen, LLP

[57] ABSTRACT

A switching power supply apparatus designed for suitably controlled stabilization of its output. The apparatus has a charge control circuit. If the voltage across an input capacitor is lower than a set voltage when a main power supply switching element turns on, a control circuit switching element turns on and energy is transferred from an input power source by conduction through the control circuit switching element and an inductance, and the inductance stores transferred energy. When the main switching element turns off, the charge control circuit turns off the control circuit switching element to supply the stored energy in the inductance to the input capacitor. If the voltage across the input capacitor is equal to or higher than the set voltage when the main switching element turns on, the control circuit switching element is maintained in the off state and the inductance cannot store energy. The voltage across the input capacitor is thereby limited. In this manner, the voltage across the input capacitor is controlled so as to be stabilized at the set voltage. This stabilizes the output voltage of the apparatus and improves its circuit efficiency.

12 Claims, 7 Drawing Sheets

SWITCHING POWER SUPPLY APPARATUS

BACKGROUND OF THE INVENTION

1. Field of the Invention

The present invention relates to a switching power supply apparatus which can be incorporated in a personal computer, a facsimile machine or the like.

2. Description of the Related Art

Figure 7:
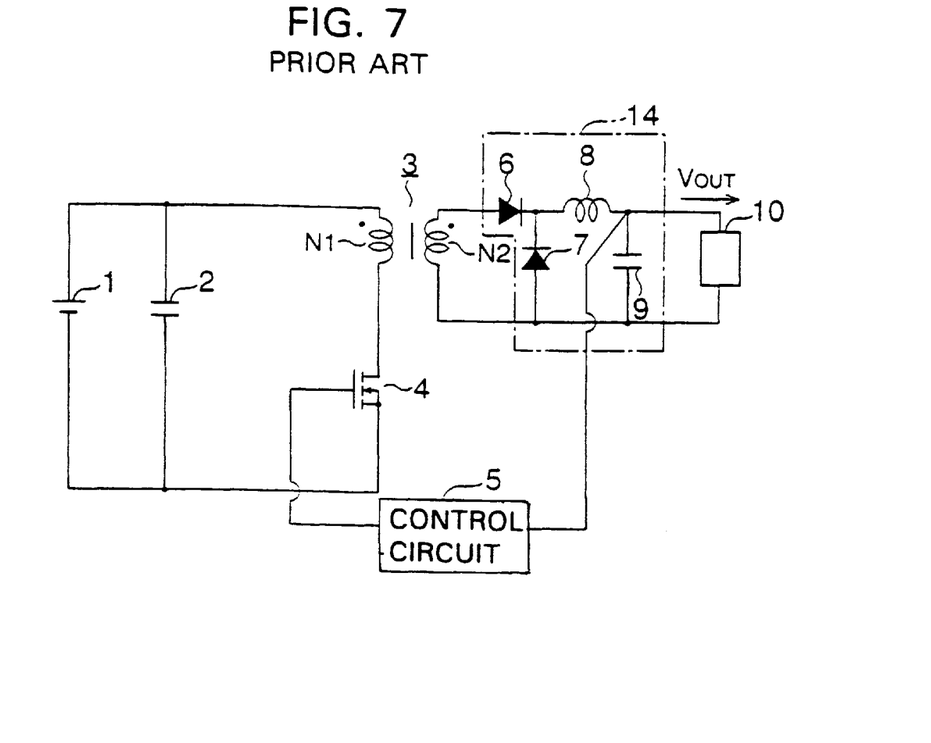
FIG. 7 is a circuit diagram of an example of a conventional apparatus.

FIG. 7 shows the configuration of essential circuit components of an example of a switching power supply apparatus. The switching power supply apparatus has a transformer 3 and other circuit elements connected as shown in FIG. 7. The positive terminal of a dc input power source 1 and one terminal of an input capacitor 2 are connected to one terminal of a primary coil N1 of the transformer 3. A drain terminal of a main switching element (metal oxide semiconductor field-effect transistor (MOSFET)) 4 is connected to the other terminal of the primary coil N1. A source terminal of the main switching element 4 is connected to the negative terminal of the dc input power source 1 and to the other terminal (grounded terminal) of the input capacitor 2. A control circuit 5 for controlling switching of the main switching element 4 is connected to a gate terminal of the main switching element 4.

The anode of a rectifier diode 6 is connected to an output terminal of a secondary coil N2 of the transformer 3. The cathode of a rectifier diode 7 and one terminal of a choke coil 8 are connected to the cathode of the rectifier diode 6. One terminal of an output capacitor 9 is connected to the other terminal of the choke coil 8. The other terminal of the secondary coil N2 and the anode of the rectifier diode 7 are connected to the other terminal of the output capacitor 9. A load 10 is connected in parallel with the output capacitor 9.

In the switching power supply apparatus arranged as described above, when the main switching element 4 is turned on by the control operation of the control circuit 5, the energy of electric charge in the input capacitor 2 supplied from the input power source 1 is transferred by conduction via the primary coil N1 and the main switching element 4 and is output from the secondary coil N2. The flow of energy output from the secondary coil N2 is rectified by the rectifier diodes 6 and 7, passes the choke coil 8, is smoothed by the choke coil 8 and is output to the load 10.

When the main switching element 4 is turned off, the energy stored in the choke coil 8 in the on state is output to the load 10 by the conduction via the load 10 and the rectifier diode 7.

As described above, the switching power supply apparatus shown in FIG. 7 is a feedforward converter type (feedforward DC-DC converter type) circuit such that the energy of the dc input power source 1 is received by the input capacitor 2, and the flow of the electric charge energy in the input capacitor 2, extracted through the secondary coil N2 of the transformer 3 when the main switching device 4 turns on, is rectified and smoothed by the output circuit 14 formed by the choke coil 8 and the output capacitor 9, thereby obtaining output energy.

The control circuit 5 turns on the main switching element 4 with a predetermined switching period T, detects an apparatus output voltage $V_{OUT}$ applied to the load 10, and controls the on-off operation of the main switching element 4 by changing and controlling the switch-on period t of the main switching element 4 (i.e., the portion of the switching period T during which the main switching element is "on") so that the apparatus output voltage $V_{OUT}$ is maintained at a predetermined level, as described below.

For example, if the number of turns of the primary coil N1 is $N_1$; the number of turns of the secondary coil N2 is $N_2$; the switching period of the main switching element 4 is T; the switch-on period of the main switching element 4 is t; and the voltage of the input power source 1 (the charging voltage across the input capacitor 2) is $V_{IN}$, the apparatus output voltage $V_{OUT}$ is shown by the following equation (1):

$$V_{OUT}=(N_2/N_1)\cdot(t/T)\cdot V_{IN} \tag{1}$$

Since the number $N_1$ of turns of the primary coil N1, the number $N_2$ of turns of the secondary coil N2, the switching period T of the main switching element 4, and the voltage $V_{IN}$ of the input power source 1, shown in equation (1), are predetermined, it is possible to control and stabilize the apparatus output voltage $V_{OUT}$ by changing and controlling the switch-on period t of the main switching element 4.

This control for stabilizing the apparatus output voltage $V_{OUT}$ is performed as described below. When the apparatus output voltage $V_{OUT}$ is lower than a predetermined level, the control circuit 5 compensates for the decrement of the apparatus output voltage $V_{OUT}$ from the predetermined level by increasing the switch-on period t of the main switching element 4 (on-duty (t/T)) by the corresponding amount. Conversely, when the apparatus output voltage $V_{OUT}$ is higher than the predetermined level, the control circuit 5 compensates for the increment from the predetermined level by reducing the switch-on period t of the main switching element 4 (on-duty (t/T)) by the corresponding amount.

The voltage $V_{IN}$ of the input power source 1 of the above-described switching power supply apparatus is changed, for example, according to specifications of the apparatus such as a facsimile machine in which the switching power supply apparatus is incorporated. The charging voltage $V_2$ across the input capacitor 2 is also changed with the change in voltage $V_{IN}$ of the input power source 1. The input power source 1 has a predetermined variable voltage range (the range in which the charging voltage $V_2$ across the input capacitor 2 can be changed). The switching power supply apparatus is designed by setting the numbers N1 and N2 of the turns of the primary and secondary coils and other circuit constants according to voltages in the variable voltage range of the input power source 1.

However, the variable voltage range of the input power source 1 (the range in which the charging voltage $V_2$ across the input capacitor 2 can be changed) is considerably large. If the charging voltage $V_2$ across the input capacitor 2 is very high, it is necessary for the control circuit 5 to reduce the on-duty of the main switching element 4 to a very small value. The on-duty, however, cannot be reduced below a predetermined minimum on-duty value according to the circuit arrangement. In such a case, it is extremely difficult for the control circuit 5 to suitably control and stabilize the apparatus output.

The circuit arrangement shown in FIG. 7 has problems related to variations in the input capacitor charging voltage $V_2$. The input capacitor 2 receives the input power source voltage $V_{IN}$. The input capacitor voltage $V_2$ (i.e., the same voltage as the input power source voltage $V_{IN}$) is converted according to the turns ratio of the transformer 3, i.e., the ratio of the number $N_2$ of turns of the secondary coil N2 to the number $N_1$ of turns of the primary coil N1 ($N_2/N_1$). This converted voltage is induced across the secondary coil N2 and is applied to the rectifier diode 7 while the reverse voltage across the secondary coil N2 is applied to the rectifier diode 6. Therefore, the rectifier diodes 6 and 7 must have a high enough peak inverse voltage to be adapted to use at the predetermined maximum input power source voltage $V_{IN}$ (charging voltage $V_2$ across the input capacitor 2). Diodes having such a high peak inverse voltage have a large forward voltage drop and, hence, a considerably large power loss at the time of conduction. If such diodes are used, the power loss in the switching power supply apparatus becomes disadvantageously large (the circuit efficiency is reduced).

Moreover, if the input power source voltage $V_{IN}$ (the charging voltage $V_2$ across the input capacitor 2) is high, the on-duty of the main switching element 4 is considerably short, as mentioned above. If the on-duty of the main switching element 4 is shorter, the effective value of the drain current flowing between the drain and the source of the main switching element 4 when the main switching element 4 is on becomes greater, so that the power loss in the main switching element 4 at the predetermined maximum input power source voltage $V_{IN}$ becomes disadvantageously large (the circuit efficiency is reduced).

When the main switching element 4 is off, the input power source voltage $V_{IN}$ (the charging voltage across the input capacitor 2) is applied between the drain and the source of the main switching element 4. Therefore, it is necessary for the main switching element 4 to have a high enough withstand voltage as to be adapted to use at the predetermined maximum input power source voltage $V_{IN}$.

That is, a high-withstand-voltage device is used as the main switching element 4. Such a device has such a large drain-source parasitic resistance that there is a large loss of power in the main switching element 4 when the main switching element 4 is conducting. This is one of the causes of deterioration in the circuit efficiency of the switching power supply apparatus.

Figure 8:
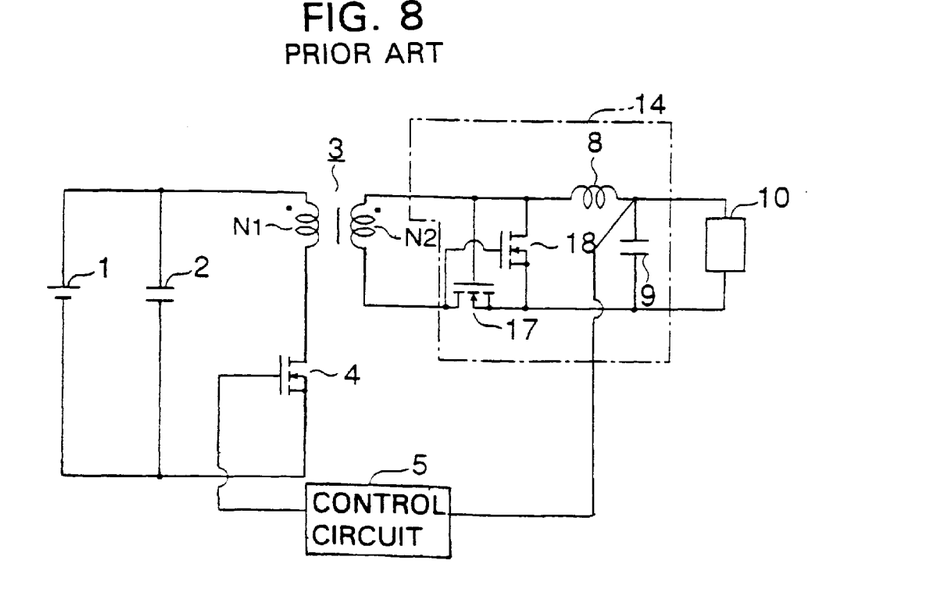
FIG. 8 is a circuit diagram of another example of a conventional apparatus.

Another example of a conventional switching power supply apparatus is shown in FIG. 8. This example will be discussed below in connection with alternate embodiments of the invention.

SUMMARY OF THE INVENTION

In view of the above-described problems, a need addressed by the present invention is to provide a switching power supply apparatus in which the input capacitor charging voltage is maintained at a predetermined level regardless of variations in the input power source voltage, which is capable of suitably stabilizing and controlling the output voltage by variable on-duty control of the main switching element even if the input power source voltage is high, and which is designed to improve the circuit efficiency (reduce the power loss) of the switching power supply apparatus by making it possible to use low-withstand-voltage elements.

According to a first aspect of the present invention, there is provided a switching power supply apparatus which is a feedforward converter type switching power supply, which has an input power source, an input capacitor and a main switching element on the primary side of a transformer, and in which charge energy in the input capacitor is output as output energy from the secondary side of the transformer when the main switching element turns on. For solving the above-described problems, this apparatus has an energy storage circuit for storing energy by receiving energy from the input power source when the main switching element turns on, an energy supply circuit for supplying the energy stored in the energy storage circuit to the input capacitor when the main switching element turns off, a voltage detection circuit for detecting the charging voltage across the input capacitor, and an off-control circuit for stopping the energy storing operation of the energy storage circuit during a time period in which the input capacitor charging voltage detected by the voltage detection circuit is equal to or higher than a predetermined value.

According to a second aspect of the present invention, the apparatus according to the first aspect of the present invention further comprises an excess current prevention circuit which detects an input current flowing from the input power source into the energy storage circuit when the main switching element turns on, and which stops the input current flowing from the input power source into the energy storage circuit by making the off-control circuit operate to stop the energy storing operation of the energy storage circuit during the time period in which the detected value of the input current is equal to or larger than a predetermined value.

According to a third aspect of the present invention, the apparatus according to the first or second aspect of the present invention further comprises a noise filter circuit provided on the input side of the voltage detection circuit. The voltage detection circuit detects the input capacitor charging voltage after noise has been removed from the voltage by the noise filter circuit.

According to a fourth aspect of the present invention, a tertiary coil is provided in the transformer according to the first, second or third aspect of the present invention. In the energy storage circuit, the input power source is connected to the input capacitor through an energy control switching element and an inductance element connected therebetween in this order, the on-off operation of the energy control switching element being controlled by a drive circuit which operates by being supplied with power from the tertiary coil. The voltage detection circuit detects, as the input capacitor charging voltage, the voltage induced across the tertiary coil when the main switching element turns on. The off-control circuit turns off the energy control switching element by the drive circuit to stop the energy storing operation of the energy storage circuit during the time period in which the input capacitor charging voltage detected by the voltage detection circuit is equal to or larger than the predetermined value.

In the above-described arrangement of the present invention, the energy storage circuit stores energy by receiving energy from the input power source, for example, when the main switching element turns on, and the energy supply circuit supplies the energy, stored in the energy storage circuit, to the input capacitor when the main switching element turns off. The voltage detection circuit detects the charging voltage across the input capacitor, and the off-control circuit stops the energy storing operation of the energy storage circuit during the time period in which the input capacitor charging voltage detected by the voltage detection circuit is equal to or larger than the predetermined value (a charge setting voltage).

As described above, the input capacitor charging voltage is detected and the energy storing operation of the energy storage circuit is stopped by the off-control circuit during the time period in which the input capacitor charging voltage is equal to or larger than the predetermined charge setting voltage. The operation of the energy supply circuit supplying energy to the input capacitor is also stopped thereby to limit a further increase in the input capacitor charging voltage. When the input capacitor charging voltage is lower than the charge setting voltage, energy is supplied to the input capacitor. In this manner, the input capacitor charging voltage can be stabilized at the charge setting voltage.

The energy in the input capacitor at the charge setting voltage is transferred by conduction through the primary side of the transformer and the main switching element to be output as output energy from the secondary side of the transformer when the main switching element turns on. Accordingly, the fixed voltage and current are applied to the primary side of the transformer and the main switching element regardless of variations in the voltage of the input power source, thereby supplying a predetermined constant amount of voltage energy to the secondary side of the transformer. Thus, even when the voltage of the power source becomes high, the voltage applied to the main switching element and the voltage applied to the secondary side of the transformer are not increased.

Therefore, a low-withstand-voltage switching element can be used as the main switching element, and the components on the secondary side of the transformer can also be formed of low-withstand-voltage elements, so that the circuit efficiency of the switching power supply apparatus can be improved.

Since the apparatus output can be smoothly controlled through on-duty control of the main switching element, the switching power supply apparatus can stably output the predetermined apparatus output voltage.

DESCRIPTION OF EMBODIMENTS OF THE INVENTION

Figure 1:
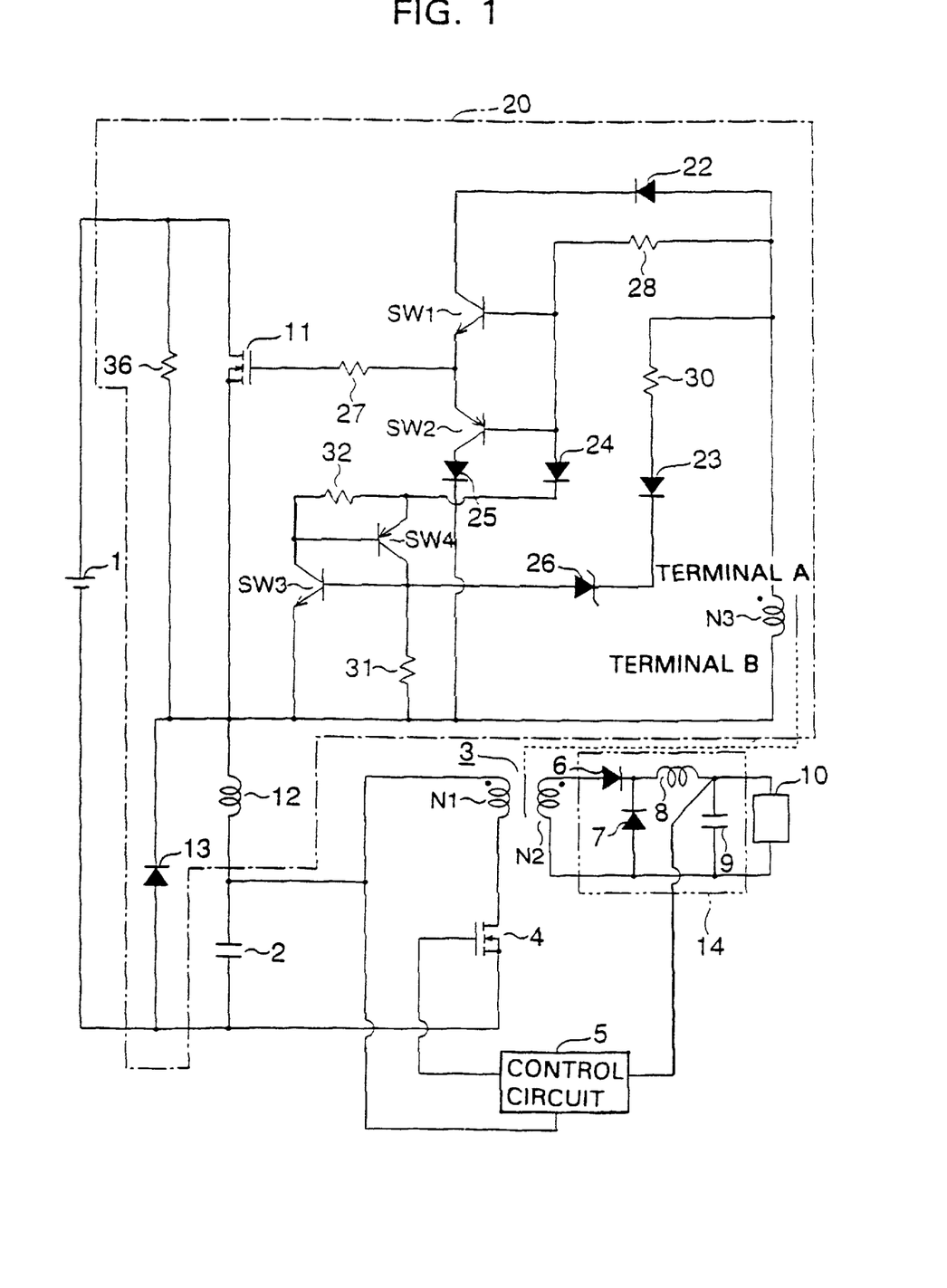
FIG. 1 is a circuit diagram of a first embodiment of the present invention.

Embodiments of the present invention will be described below with reference to the accompanying drawings.
First Embodiment FIG. 1 shows the circuit configuration of a switching power supply apparatus which represents a first embodiment of the present invention. In comparison with the switching power supply apparatus shown in FIG. 7, the switching power supply apparatus shown in FIG. 1 is characterized by being provided with a charge control circuit 20, which is arranged to control the charging of an input capacitor 2 by energy from an input power source 1 so that a charging voltage $V_2$ across the input capacitor 2 is equal to a predetermined value (charge setting voltage) $V_{CTL}$. The switching power supply apparatus of this embodiment is arranged so that the energy in the input capacitor 2 at the charge setting voltage controlled by the charge control circuit 20 is output from a secondary coil N2 of a transformer 3 to a load 10 by an output circuit 14 when a main switching element 4 turns on. By controlling the charging voltage $V_2$, it is possible to solve the above-described problems of the conventional art. In other respects, the configuration is the same as that shown in FIG. 7 and, therefore, no further description will be given of it.

The charge control circuit 20 includes a tertiary coil N3 provided in the transformer 3. As shown in FIG. 1, one terminal (terminal B) of the tertiary coil N3 is connected to one terminal of an inductance element 12. The anode of a diode 13 is connected to the other terminal of the inductance element 12. The cathode of the diode 13 is connected to the connection point between the tertiary coil N3 and the inductance element 12. To the connection point between the tertiary coil N3 and the inductance element 12, a source terminal of an energy control switching element (MOSFET) 11 and one terminal of a resistor 36 are also connected. A drain terminal of the energy control switching element 11 and the other terminal of the resistor 36 are connected to the positive terminal of the input power source 1.

The anode of a diode 22, one terminal of a resistor 28 and one terminal of a resistor 30 are connected to the terminal A of the tertiary coil N3. A collector terminal of a switching element (transistor element) SW1 is connected to the cathode of the diode 22. The other terminal of the resistor 28 is connected to a base terminal of the switching element SW1. One terminal of a resistor 27 and an emitter terminal of a switching element (transistor element) SW2 are connected to an emitter terminal of the switching element SW1. The other terminal of the resistor 27 is connected to a gate terminal of the energy control switching element 11. A collector terminal of the switching element SW2 is connected to the anode of a diode 25. The cathode of the diode 25 is connected to the terminal B of the tertiary coil N3.

A base terminal of the switching element SW2 is connected to the connection point between the base terminal of the switching element SW1 and the resistor 28 and to the anode of a diode 24. The cathode of the diode 24 is connected to one terminal of a resistor 32 and to an emitter terminal of a switching element (transistor element) SW4. The other terminal of the resistor 32 is connected to a base terminal of the switching element SW4 and to a collector terminal of a switching element (transistor element) SW3. An emitter terminal of the switching element SW3 is connected to the terminal B of the tertiary coil N3.

A collector terminal of the switching element SW4, the anode of a zener diode 26 and one terminal of a resistor 31 are connected to a base terminal of the switching element SW3. The other terminal of the resistor 31 is connected to the terminal B of the tertiary coil N3. The cathode of the zener diode 26 is connected to the cathode of a diode 23. One terminal of the resistor 30 is connected to the anode of the diode 23. The other terminal of the resistor 30 is connected to the terminal A of the tertiary coil N3, as mentioned above.

The charge control circuit 20 specific to this embodiment is thus arranged. The energy control switching element 11 and the inductance element 12, constituting the charge control circuit 20, form an energy storage circuit. In this energy storage circuit, the energy control switch 11 turns on to cause a flow of energy from the input power source 1 into the inductance element 12 when the main switching element 4 turns on, thereby storing energy in the inductance element 12.

The inductance element 12 and the diode 13 form an energy supply circuit, which supplies the input capacitor 2 with the energy stored in the inductance element 12 when the main switching element 4 turns off. The switching element SW1, the diode 22 and the resistors 27 and 28 form a drive circuit for driving the energy control switching element 11. This drive circuit is used to control the on-off operation of the energy control switching element 11 in synchronization with the on-off operation of the main switching element 4 by using the voltage generated across the tertiary coil N3.

The diode 23, the zener diode 26 and the resistor 30 form a voltage detection circuit, which detects, in order to determine the charging voltage $V_2$ of the input capacitor 2, a voltage $V_3$ induced across the tertiary coil N3 when the main switching element 4 switches on. The switching elements SW2, SW3, and SW4, the diodes 24 and 25 and the resistors 31 and 32 form an off-control circuit, which stops the energy storing operation of the energy storage circuit by maintaining the energy control switching element 11 in the off state by the drive circuit during a time period in which the input capacitor 2 charging voltage detected by the voltage detection circuit is equal to or higher than the charge setting voltage $V_{CTL}$.

The inductance element 12 and the resistor 36 form a starting circuit. When the input capacitor 2 charging voltage is substantially zero or very low, for example at a start of the switching power supply apparatus, energy is caused to flow from the input power source 1 into the input capacitor 2 by passing through the resistor 36 and then the inductance element 12 in this starting circuit, thereby increasing the voltage across the input capacitor 2. Charge energy in the input capacitor 2 is output from secondary coil N2 of the transformer 3 to the load 10 by the output circuit 14 when the main switching element 4 turns on, as described above. In this embodiment, a part of the energy is used as energy for driving the control circuit 5.

Figure 2:
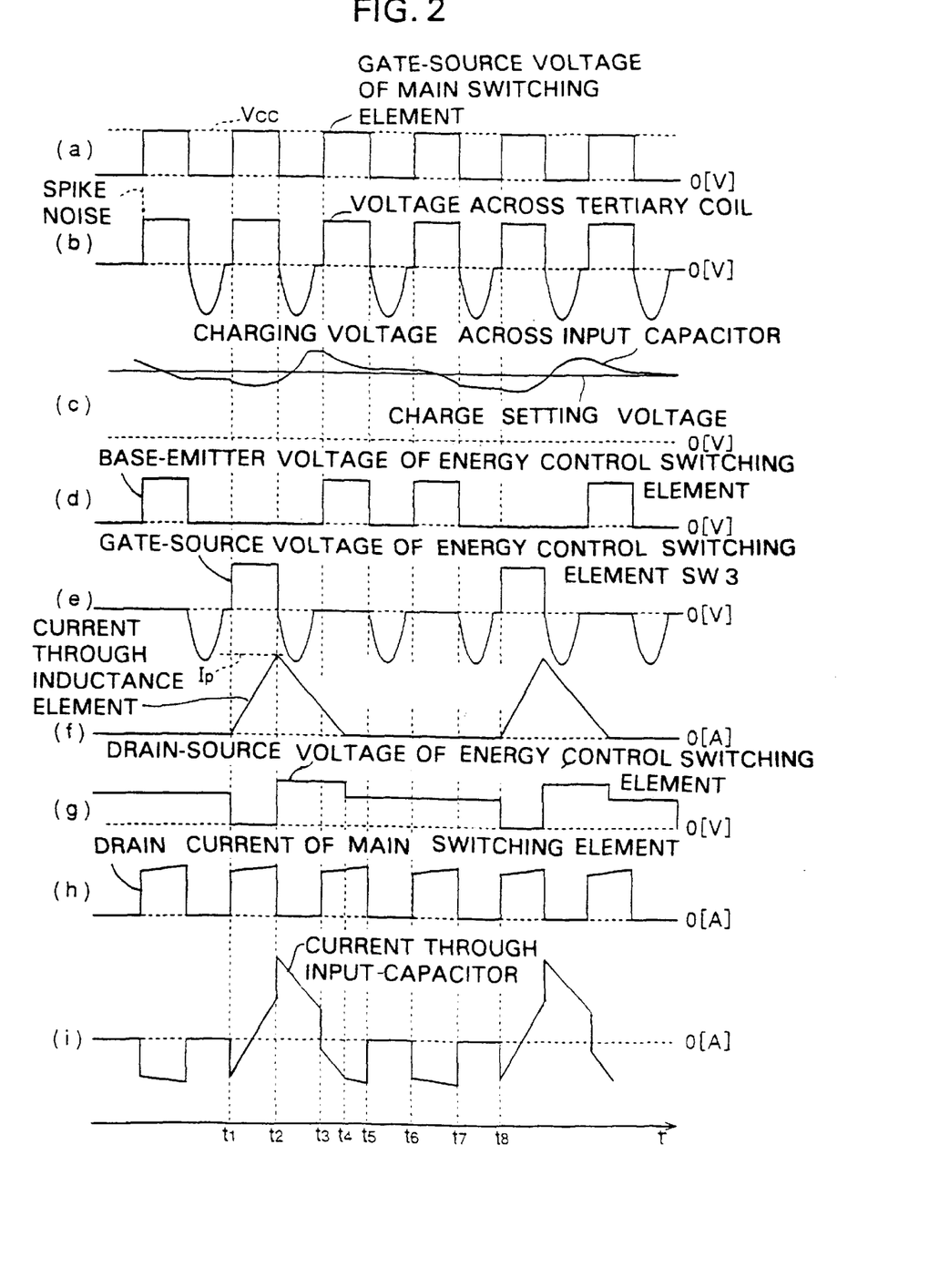
FIG. 2 is a time chart of an example of the operation of each circuit component shown in FIG. 1.

The operation of the charge control circuit 20 specific to this embodiment will now be described with reference to the time chart of FIG. 2. First, when a voltage $V_{CC}$ shown in (a) of FIG. 2 is applied as a predetermined switch-on drive voltage between the gate and source of the main switching element 4 by the control operation of the control circuit 5 (at time $t_1$), the main switching element 4 turns on to cause the charge energy in the input capacitor 2 to flow through the primary coil N1 and the main switching element 4. The charge energy in the input capacitor 2 is thereby supplied from the secondary coil N2 to the output circuit 14 and is output as output energy from the output circuit 14 to the load 10. Simultaneously, the voltage $V_3$ shown by the following equation (2) is induced across the tertiary coil N3 with a higher potential at the terminal A.

$$V_3 = (N_3/N_1) \cdot V_2 \qquad (2)$$

In the above equation (2), $N_1$ is the number of turns of the primary coil N1, $N_3$ is the number of turns of the tertiary coil N3, and $V_2$ is the charging voltage across the input capacitor 2.

That is, the voltage equal to the product of the input capacitor 2 charging voltage $V_2$ and the turns ratio ($N_3/N_1$) of the number $N_3$ of turns of the tertiary coil N3 to the number $N_1$ of turns of the primary coil N1 is induced across the tertiary coil N3 when the main switching element 4 turns on.

The voltage $V_3$ across the tertiary coil N3 is applied to the diode 22 and to the resistor 30, the diode 23 and the zener diode 26 in series connection. At this time, if the input capacitor 2 charging voltage $V_2$ is lower than the predetermined charge setting voltage $V_{CTL}$ as in the state at the time $t_1$ shown in (c) of FIG. 2, the diode 23 and the zener diode 26 maintain the switch-off state, so that the circuit operation is as described below.

Under this condition, the diode 22 turns on in response to the voltage $V_3$ across the tertiary coil N3, and a base current flows into the base of the switching element SW1 from the tertiary coil N3 via the resistor 28, so that the switching element SW1 turns on. The energy due to the voltage $V_3$ across the tertiary coil N3 is then applied to the gate of the energy control switching element 11 via the diode 22, the switching element SW1 and the resistor 27, thereby turning on the energy control switching element 11.

By this switch-on operation of the energy control switching element 11, energy flows from the input power source 1 into the inductance element 12 via the energy control switching element 11, as shown in (f) of FIG. 2. By this energization, energy is stored in the inductance element 12.

When the main switching element 4 is turned off by the control operation of the control circuit 5 (at time $t_2$), the voltage $V_3$ across the tertiary coil N3 is inverted in polarity, as shown in (b) of FIG. 2, so that a voltage is generated across the tertiary coil N3 with a lower potential at the terminal A. In response to this voltage, the diode 22 and the switching element SW1 turn off. Consequently, the energy control switching element 11 turns off.

By the above-described switch-off operation of the main switching element 4 and the energy control switching element 11, the energization across the inductance element 12 with the energy from the input power source 1 is stopped. Simultaneously, the diode 13 turns on and the energy stored in the inductance element 12 is supplied to the input capacitor 2 by conduction through the input capacitor 2 and the diode 13, so that the charging voltage across the input capacitor 2 rises, as shown in (c) of FIG. 2.

When the main switching element 4 is thereafter turned on again by the control operation of the control circuit 5 (at time $t_3$), the voltage equal to the product of the input capacitor 2 charging voltage $V_2$ and the turns ratio ($N_3/N_1$) is induced across the tertiary coil N3, as described above. The induced voltage across the tertiary coil N3 is applied to the diode 22 and to the resistor 30, the diode 23 and the zener diode 26 in series connection. At this time, if the input capacitor 2 charging voltage $V_2$ is equal to or higher than the charge setting voltage $V_{CTL}$ as in the state at time $t_3$ shown in (c) of FIG. 2, each of the diode 23 and the zener diode 26 turns on.

By the above-described switch-on operation of the diode 23 and the zener diode 26, the switching element SW3 turns on by being supplied, through its base, with a base current from the tertiary coil N3 via the resistor 30, the diode 23 and the zener diode 26. Simultaneously, the diode 24 turns on, a current from the tertiary coil N3 flows via the resistor 28, the diode 24, the resistor 32 and the switching element SW3, and base currents flow respectively through the bases of the switching elements SW2 and SW4, thereby turning on the switching elements SW2 and SW4.

The switching element SW1 is maintained in the off state by the above-described switch-on operation of the switching element SW2. The energy control switching element 11 is also maintained in the switch-off state thereby. As described above, when the energy control switching element 11 is in the switch-off state, the inductance element 12 is not energized with energy from the input power source 1 and no energy is stored in the inductance element 12.

Needless to say, when the switching element 4 is on, the input capacitor 2 charging voltage drops, as observed in the period from time $t_4$ to time $t_5$ shown in (c) of FIG. 2 since, during the switch-on period of the main switching element 4, the charge energy in the input capacitor 2 flows via the primary coil N1 and the main switching element 4 to be output as output energy from the secondary coil N2 to the load 10.

Thereafter, when the main switching element 4 is turned on by the control operation of the control circuit 5 (at time $t_5$), the voltage polarity of the tertiary coil N3 is inverted, and each of the diodes 23 and 24, the zener diode 26, the switching elements SW2, SW3, and SW4 turns off, as described above. Since no energy is stored in the inductance element 12 during this switch-off period of the main switching element 4 (from time $t_5$ to time $t_6$), no energy can be supplied from inductance element 12 to the input capacitor 2, so that the input capacitor 2 charging voltage does not increase, as observed in the period from time $t_5$ to time $t_6$ shown in (c) of FIG. 2.

As described above, the charge control circuit 20 turns on and off the energy control switching element 11 in synchronization with the on-off operation of the main switching element 4 by utilizing the voltage across the tertiary coil N3 to charge the input capacitor 2 with energy from the input power source 1. Also, the charge control circuit 20 detects the voltage $V_3$ across the tertiary coil N3 as the input capacitor 2 charging voltage $V_2$. During the time period in which the detected charging voltage $V_2$ is equal to or higher than the predetermined charge setting voltage $V_{CTL}$, the charge control circuit 20 stops the operation of charging the input capacitor 2 by maintaining the energy control switching element 11 in the off state, thus stabilizing the input capacitor 2 charging voltage $V_2$ at the charge setting voltage $V_{CTL}$.

As the charge setting voltage $V_{CTL}$ for charging of the input capacitor 2, a suitable voltage value is set such as to avoid application to the main switching element 4 of a voltage higher than the predetermined withstand voltage of the main switching element 4 and to avoid application to the rectifier diodes 6 and 7 of a voltage higher than the predetermined peak inverse voltage of the rectifier diodes 6 and 7. This charge setting voltage $V_{CTL}$ is represented by the following equation (3):

$$V_{CTL} \cong (N_1/N_3) \cdot (V_{26} + V_F + V_{SW3}) \qquad (3)$$

In this equation (3), $N_1$ is the number of turns of the primary coil N1, $N_3$ is the number of turns of the tertiary coil N3, $V_{26}$ is the switch-on drive voltage of the zener diode 26, $V_F$ is the switch-on drive voltage of the diode 23, and $V_{SW3}$ is the switch-on drive voltage of the switching element SW3.

Since number $N_1$ of turns of the primary coil N1, the number $N_3$ of turns of the tertiary coil N3, and the switch-on drive voltage $V_{SW3}$ of the switching element SW3 in the above equation are predetermined, the switch-on drive voltages of the zener diode 26 and the diode 13 are determined so as to obtain the set charge setting voltage $V_{CTL}$, thereby enabling the charge control circuit 20 to stabilize the input capacitor charging voltage $V_2$ at the charge setting voltage $V_{CTL}$.

This embodiment uses the charge control circuit 20 and is arranged so that the charging voltage $V_2$ across the input capacitor 2 is stabilized at the predetermined charge setting voltage $V_{CTL}$. As a result, even if the voltage $V_{IN}$ of the input power source 1 is varied, the input capacitor 2 charging voltage $V_2$ can be stabilized at the predetermined charge setting voltage $V_{CTL}$.

Accordingly, when the main switching element 4 is turned on, the energy in the input capacitor at the charge setting voltage $V_{CTL}$ is output as output energy through the transformer 3 regardless of variations in the voltage $V_{IN}$ of the input power source 1. Therefore, the control circuit 5 can suitably stabilize and control the apparatus output by variable on-duty control of the main switching element 4 even if the voltage $V_{IN}$ of the input power source 1 is high, thus making it possible to improve the reliability of the operation of the switching power supply apparatus.

Also, a voltage lower than the voltage $V_{IN}$ of the input power source 1 is set as the charge setting voltage for charging of the input capacitor 2, and the charging voltage across the input capacitor 2 can be stabilized at the charge setting voltage by the charge control circuit 20. Therefore, the voltage applied between the drain and source of the main switching element 4 during the switch-off period of the main switching element 4 can be reduced. Also, by the variable on-duty control of the control circuit 5, the effective value of the drain current of the main switching element 4 during the switch-on period of the main switching element 4 can be reduced. As a result, a low-withstand-voltage switching element can be used as the main switching element 4.

Further, even if the voltage $V_{IN}$ of the input power source 1 is high, a predetermined fixed reverse voltage is applied to each of the rectifier diodes 6 and 7 constituting the output circuit 14 since the energy in the input capacitor 2 at the charge setting voltage $V_{CTL}$ is supplied to the output circuit 14 through the transformer 3 during the on period of the main switching element 4 regardless of variations in the voltage $V_{IN}$ of the input power source 1, as described above. It is, therefore, possible to use diodes having a low peak inverse voltage (i.e., those having a small forward voltage drop) as the rectifier diodes 6 and 7.

As described above, the main switching element 4 can be formed of a low-withstand-voltage element, and the rectifier diodes 6 and 7 can be formed of elements having a small forward voltage drop. Such elements are low-loss elements and are therefore capable of limiting power loss in the main switching element 4 and the rectifier diodes 6 and 7.

When the control for stabilizing the input capacitor 2 charging voltage is performed by the above-described operation of the charge control circuit 20, the energy control switching element 11 turns on with a substantially constant switching period $T_L$ (three times the switching period T of the main switching element 4 ($T_L=3T$), as shown in (e) of FIG. 2, in this embodiment). If the inductance value of the inductance element 12 is $L_{12}$ and if the value of peak current through the inductance element 12 shown in (f) of FIG. 2 is $I_P$, energy $E_{12}$ stored in the inductance element 12 each time the energy control switching element 11 turns on is shown by the following equation (4):

$$E \cong (\tfrac{1}{2}) \cdot L_{12} \cdot L_P^3 \qquad (4)$$

The peak current value $I_P$ of the inductance element 12 shown in this equation (4) is determined by the differential voltage by which the input capacitor 2 charge setting voltage $V_{CTL}$ is lower than the input voltage $V_{IN}$ of the input power source 1, the inductance value $L_{12}$ of the inductance element 12 and the on-duty of the main switching element 4. Therefore, if the voltage $V_{IN}$ of the input power source 1 is constant, energy $E_{12}$ stored in the inductance element 12 each time the energy control switching element 11 turns on can be made constant. Also, if the power consumed in the load 10 is changed, the necessary power can be supplied by changing the switching frequency $f_L$ of the energy control switching element 11.

Second Embodiment

Figure 3:
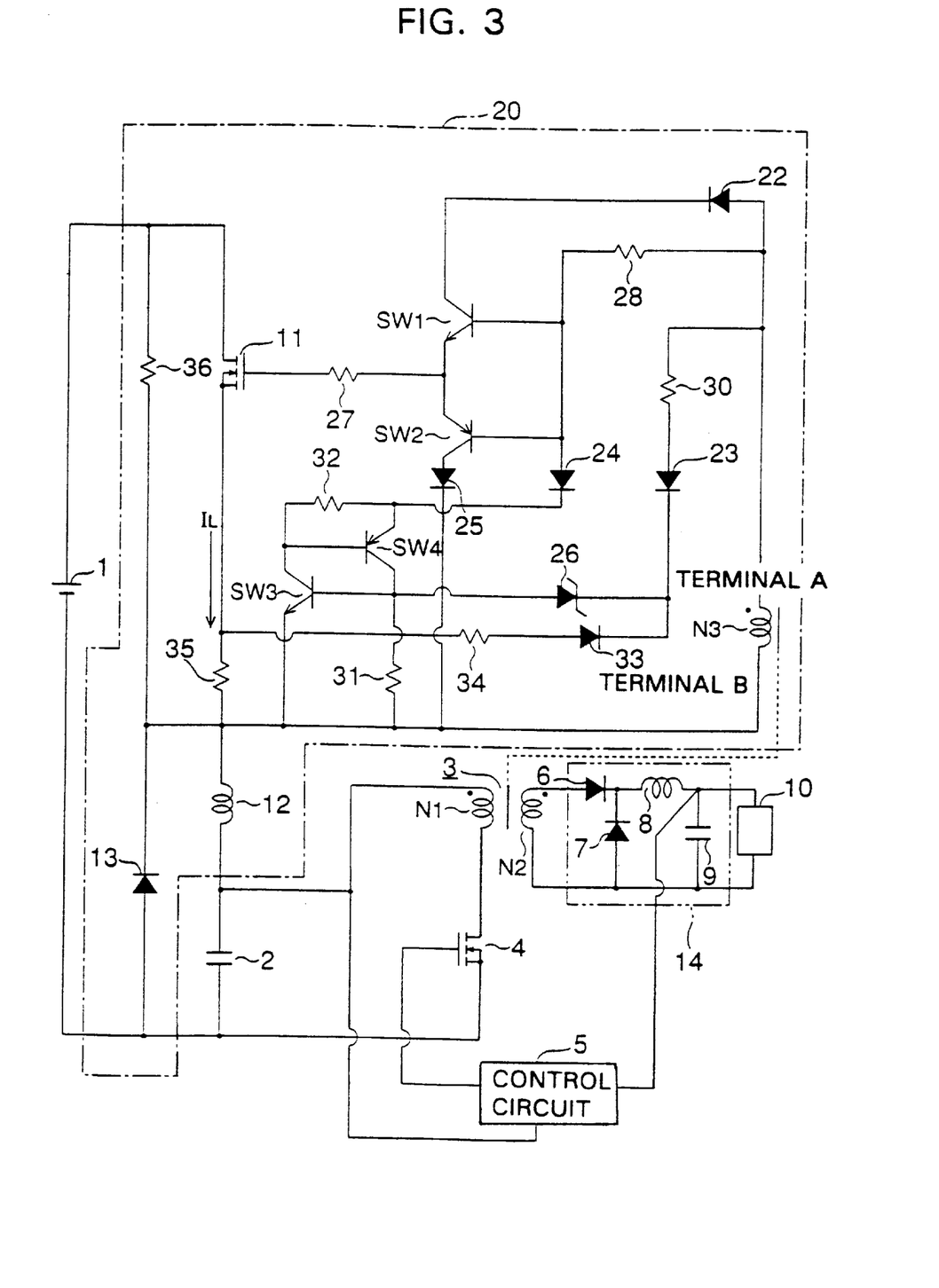
FIG. 3 is a circuit diagram of a second embodiment of the present invention.
Figure 4:
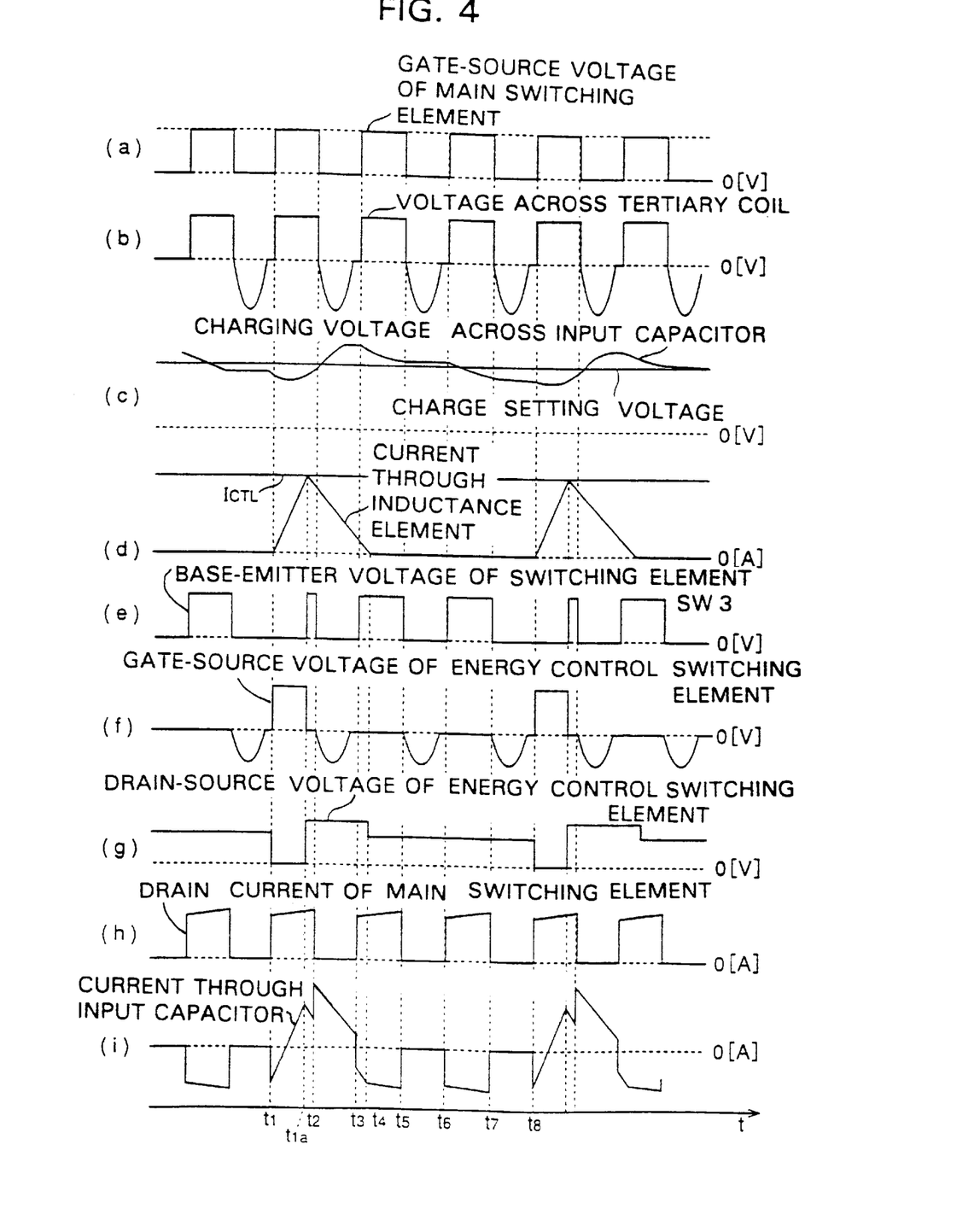
FIG. 4 is a time chart of an example of the operation of each circuit component shown in FIG. 2.

A second embodiment of the present invention will next be described. FIG. 3 shows the circuit configuration of a switching power supply apparatus which represents the second embodiment. FIG. 4 is a time chart showing an example of the operation of components of the circuit shown in FIG. 3. This embodiment is characterized by providing an excess current prevention circuit in the arrangement of the first embodiment. As shown in FIG. 3, this excess current prevention circuit is formed of the zener diode 26 in the voltage detection circuit, a diode 33 and resistors 34 and 35. The excess current prevention circuit protects the energy control switching element 11 of the energy storage circuit from an excess current, that is, it prevents a current higher than a predetermined allowable current through the switching element 11 from flowing through the switching element 11. In other respects, the configuration of this embodiment is the same as that of the first embodiment and, therefore, no further description will be given of it.

In the circuit arrangement shown in FIG. 1, a current $I_L$ of energy from the input power source 1 (input current) flows through the energy control switching element 11 and the inductance element 12 when the main switching element 4 and the control switching element 11 turn on. The current $I_L$ increases during the switch-on period of the switching elements 4 and 11 as shown in (f) of FIG. 2. The peak value $I_P$ of the current $I_L$ is determined by the differential voltage DV by which the input capacitor 2 charge setting voltage $V_{CTL}$ is lower than the input voltage $V_{IN}$ of the input power source 1, the inductance value $L_{12}$ of the inductance element 12, and the on-duty of the main switching element 4, as mentioned above.

For example, if the voltage $V_{IN}$ of the input power source 1 is very high, there is a possibility of the value of differential voltage DV becoming so large that the peak current $I_P$ is excessively larger than the allowable current through the energy control switching element 11. In such a situation, there is a risk of the energy control switching element 11 being damaged by the excess current. In this embodiment, therefore, the excess current prevention circuit is provided to prevent such an excess current through the energy control switching element 11.

The excess current prevention circuit is formed of the zener diode 26 in the voltage detection circuit, the diode 33 and the resistors 34 and 35, as shown in FIG. 3. The resistor 35 is connected between the energy control switching element 11 and the inductance element 12 in series with these elements. One terminal of the resistor 34 is connected to the series connection point between the resistor 35 and the source of the energy control switching element 11. The anode of the diode 33 is connected to the other terminal of the resistor 34, and the cathode of the diode 33 is connected to the cathode of the zener diode 26.

The resistor 35 detects the current $I_L$ flowing through the energy control switching element 11 and the inductance element 12 by converting the current into a voltage. This detected voltage is applied to the zener diode 26, the diode 33 and the resistor 34 in series connection. The zener diode 26 and the diode 33 turn on when the current $I_L$ becomes equal to a predetermined upper limit current value $I_{CTL}$, as shown in (d) of FIG. 4, after the main switching device 4 has turned on (at time $t_i$). By the switch-on operation of the zener diode 26, the switching element SW3 turns on, as in the first embodiment. The switching elements SW2 and SW4 also turn on thereby, so that the switching element SW1 turns off, whereby the energy control switching element 11 turns off.

Naturally, no current flows through the energy control switching element 11 when the energy control switching element 11 turns off as described above. Thus, an excess current is prevented from flowing through the energy control switching element 11.

That is, the upper limit current value $I_{CTL}$ is set to a suitable value equal to or lower than the allowable current through the energy control switching element 11 and such that the amount of energy large enough to sufficiently charge the input capacitor 2 can be stored in the inductance element 12. When the current $I_L$ becomes equal to the set upper limit current value $I_{CTL}$, the energy control switching element 11 is turned off as described above, thereby preventing an excess current through the energy control switching element 11. It is also possible to prevent an excessive reduction in the switching frequency $f_L$ of the energy control switching element 11 since the amount of energy stored in the inductance element 12 each time the energy control switching element 11 turns on can be limited.

The upper limit current value $I_{CTL}$ can be expressed by equation (5) shown below if the resistance of the resistor 35 is $R_{35}$, and the switch-on drive voltages of the switching element SW3, the zener diode 26 and the diode 33 are $V_{SW3}$, $V_{26}$ and $V_f$, respectively. Since the switch-on drive voltages $V_{SW3}$ and $V_{26}$ of the switching element SW3 and the zener diode 26 are determined in the same manner as in the first embodiment, the resistance $R_{35}$ of the resistor 35 and the switch-on drive voltage $V_f$ of the diode 33 are set so that the current $I_L$ is limited to the set upper limit value $I_{CTL}$, thus forming the excess current prevention circuit.

$$I_{CTL}=(V_{SW3}+V_{26}+V_f)/R35 \qquad (5)$$

In this embodiment, the excess current prevention circuit is added to the arrangement of the first embodiment to prevent an excess current through the energy control switching element 11. Thus, in addition to the advantages of the first embodiment, the energy control switching element 11 can also be protected from excessive energization by reliably preventing an excess current therethrough. It is also possible to prevent an excessive reduction in the switching frequency $f_L$ of the energy control switching element 11.

Because of the above-described protection of the energy control switching element 11, it is possible to use a low-withstand-voltage switching element as the energy control switching element 11.

Third Embodiment

Figure 5:
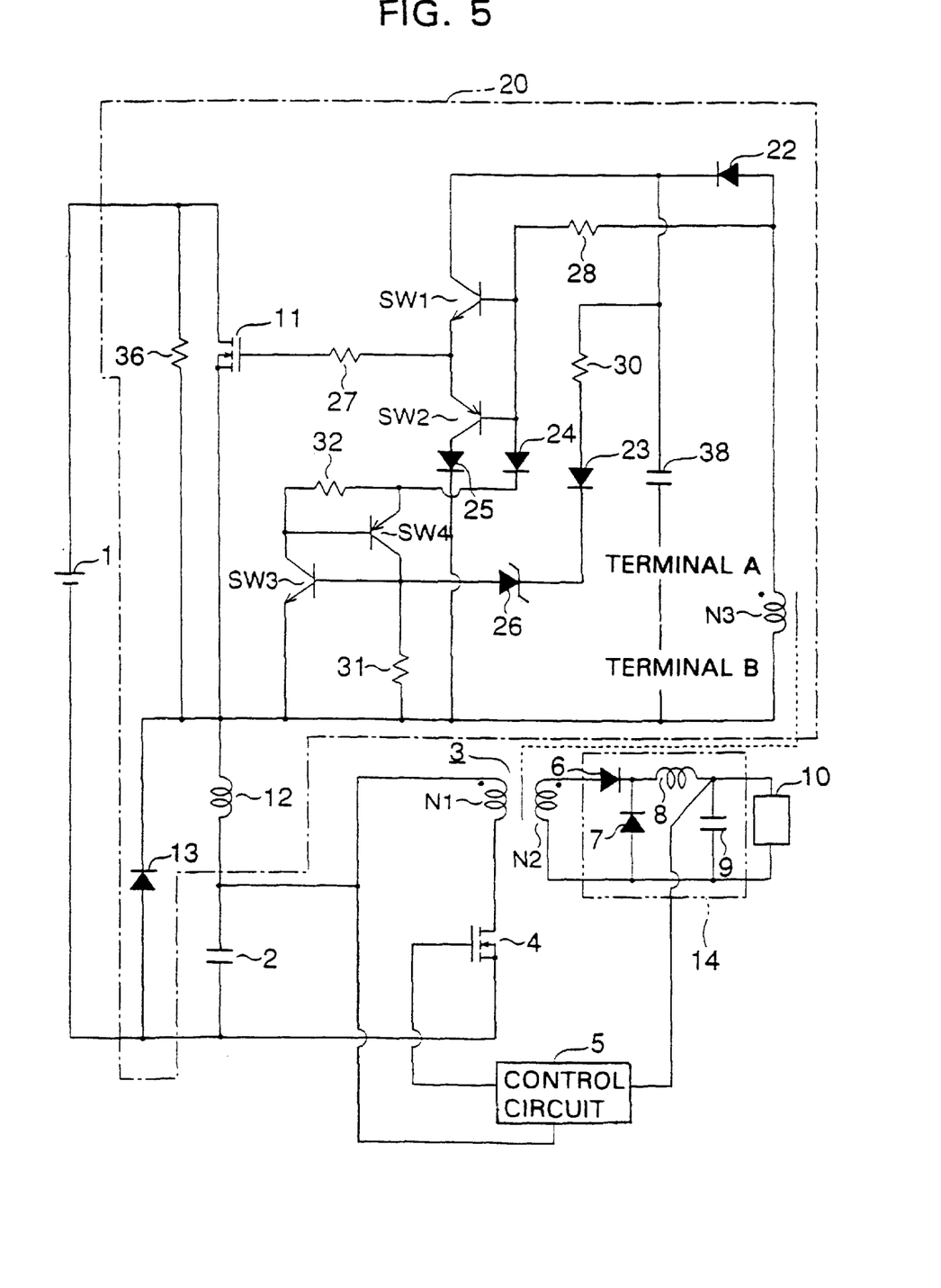
FIG. 5 is a circuit diagram of a switching power supply apparatus which represents a third embodiment of the present invention, and which has a noise filter circuit.
Figure 6:
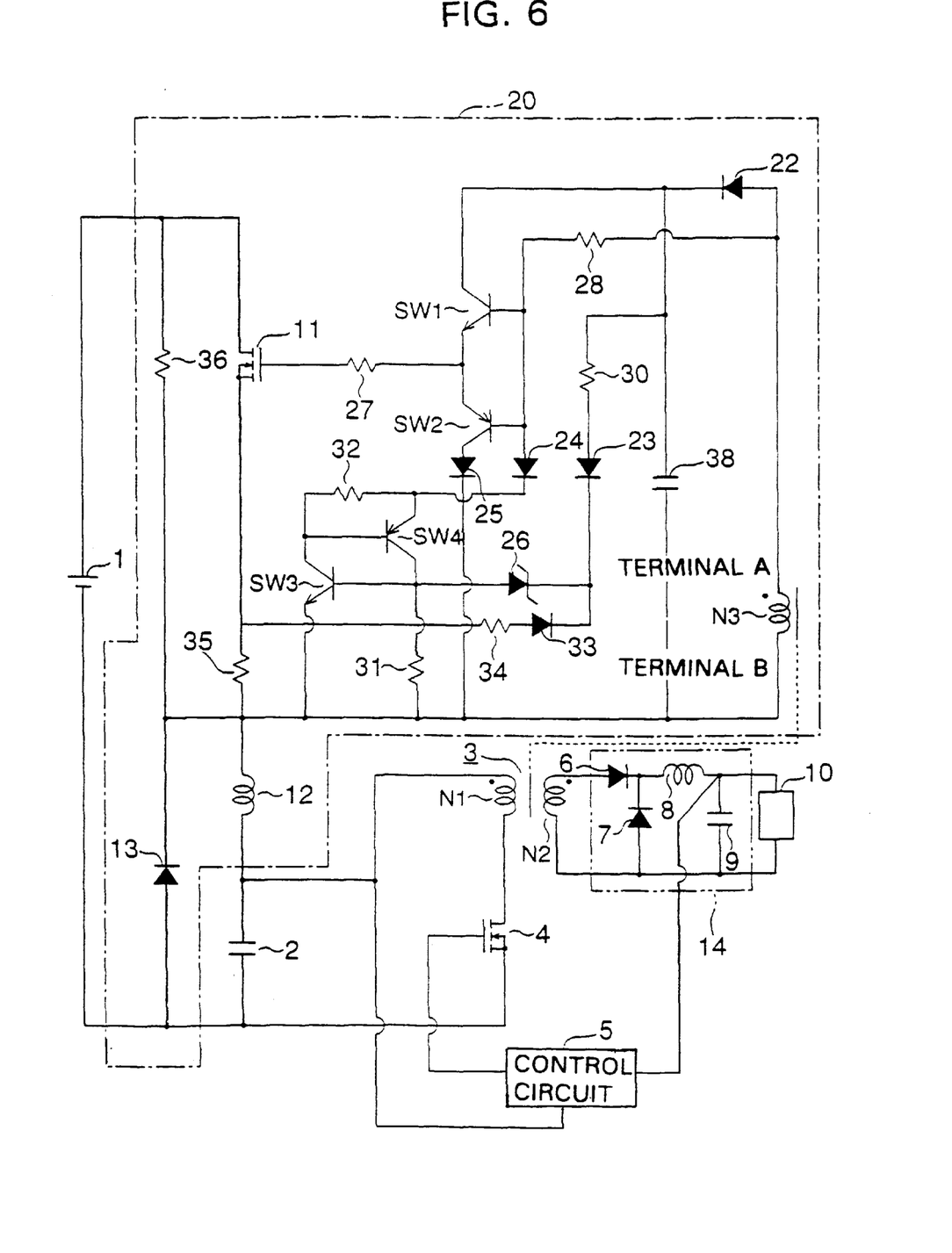
FIG. 6 is a circuit diagram of another example of the switching power supply apparatus having a noise filter circuit.

A third embodiment of the present invention will next be described. This embodiment is characterized by adding to the first or the second embodiment a noise filter circuit formed by a noise filter capacitor 38, as shown in FIG. 5 or 6. In other respects, the configuration of this embodiment is the same as that of the above-described embodiments and, therefore, no further description will be given of it.

When the main switching element 4 is turned on, there is a possibility of the occurrence of spike noise such as that indicated by a broken line in (b) of FIG. 2. If such spike noise is large, it may cause an operation error, such as the diode 23 and the zener diode 26 turning on when it is necessary that the diode 23 and the zener diode 26 remain off in the circuit shown in FIG. 1 or 3.

In this embodiment, therefore, the filter capacitor 38 is provided to filter off noise in the voltage across the tertiary coil N3 before the voltage is applied to the resistor 30, the diode 23 and the zener diode 26, which are connected in series with each other to form a voltage detection circuit, as shown in FIG. 5 or 6.

The filter capacitor 38 is connected between the cathode of the diode 22 and the terminal B of the tertiary coil N3 in series with the diode 22. One terminal of the resistor 30 is connected to the series connection point between the filter capacitor 38 and the cathode of the diode 22. As descried above, the filter capacitor 38 receives the voltage across the tertiary coil N3 and filters off noise from the voltage. The voltage from which noise has been thereby removed is applied to the voltage detection circuit.

In this embodiment, the filter capacitor 38 is added to each of the arrangements of the above-described embodiments. Therefore, this embodiment, having the same advantages as the above-described embodiments, also has the advantage of applying the voltage across the tertiary coil N3 to the voltage detection circuit while removing, by the filter capacitor 38, spike noise generated in the voltage across the tertiary coil N3 when the main switching element 4 turns on. It is therefore possible to reliably avoid an error in the operation of the diode 23 or zener diode 26 of the voltage detection circuit caused by such spike noise. Thus, the reliability of the switching power supply apparatus can be improved.

Alternate Embodiments

The present invention is not limited to the above-described embodiments. The present invention may take other various forms. For example, while the synchronized rectifier of the output circuit 14 is formed of the rectifier diodes 6 and 7 in the above-described embodiments, it may alternatively be formed of MOSFETs 18 and 17 shown in FIG. 8 or the like instead of the rectifier diodes 6 and 7. The same charge control circuit 20 as that of the above-described embodiments may also be used in such a case to achieve the same advantages as those of the above-described embodiments.

The energy control switching element 11 is formed of a MOSFET in the above-described embodiments. However, it may be alternatively be formed of a transistor device other than the MOSFET.

SUMMARY

According to the present invention, the energy storage circuit, the energy supply circuit, the voltage detection circuit and the off-control circuit are provided to stabilize the input capacitor charging voltage at a predetermined value (charge setting voltage), thereby enabling the input capacitor charging voltage to be stabilized at the charge setting voltage regardless of variations in the input power source voltage. The energy stored in the input capacitor at the charge setting voltage is output as output energy from the secondary side of the transformer when the main switching element turns on, regardless of changes in the input power source voltage. Therefore, even if the input power source voltage becomes substantially higher, the apparatus output stabilization control can be suitably performed, thus improving the reliability of the operation of the switching power supply apparatus.

Since, as described above, the apparatus is arranged so that the input capacitor charging voltage is stabilized at the charge setting voltage, a voltage lower than the input power source voltage may be set as the charge setting voltage at which the input capacitor charging voltage is stabilized. Since the voltage and current according to the charge energy in the input capacitor are applied to the main switching element, the voltage applied to the main switching element can be limited to a small value. Therefore, a low-withstand-voltage switching element can be used as the main switching element.

Also, the voltage of the energy supplied to the secondary side of the transformer can be made constant regardless of variations in the input power source. Therefore, even if the input power source voltage becomes substantially higher, the voltage applied to the secondary side of the transformer is not increased, so that the circuit on the secondary side of the transformer can be formed by using low-withstand-voltage elements.

As described above, the switching power supply apparatus can be formed by using low-withstand voltage elements. Since power loss in such elements is small, the power loss in the switching power supply apparatus can be reduced, so that the circuit efficiency can be improved.

In the arrangement of the present invention having the excess current prevention circuit, the excess current prevention circuit detects the input current flowing from the input power source into the energy storage circuit, and stops the input current from the input power source into the energy storage circuit during the time period in which the input current is larger than a predetermined value. In a case where the voltage of the input power source is so high that there is a risk of an excess current larger than a predetermined allowable current flowing through the energy storage circuit, it is possible to prevent, by the operation of the excess current prevention circuit, such an excess current from flowing through the energy storage circuit. Thus, the components of the energy storage circuit can be protected. It is also possible to prevent an excessive reduction in the switching frequency of the energy control switching element.

It is possible to form the energy control switching element of a low-withstand-voltage switching element because an excess current is prevented from flowing through the energy storage circuit. Since a low-withstand-voltage switching element is low-priced, the apparatus can be constructed at a low cost.

In the arrangement of the present invention having the noise filter circuit, the voltage detection circuit can detect the input capacitor charging voltage after noise has been removed from the voltage by the noise filter circuit, thereby avoiding an error in detecting the input capacitor charging voltage, which may be caused by noise. Therefore, the voltage detection circuit can reliably detect the correction input capacitor charging voltage. The off-control circuit can operate accurately on the basis of the correct voltage detected by the voltage detection circuit. Thus, the reliability of the switching power supply apparatus can be further improved.

In the arrangement of the present invention having the transformer with a tertiary coil, the energy storage circuit has an energy control switching element, the on-off operation of which is controlled by a drive circuit which operates by being supplied with power from the tertiary coil, and a voltage detection circuit which detects, as the input capacitor charging voltage, the voltage across the tertiary coil when the main switching element turns on. In this arrangement, the on-off operation of the energy storage circuit can easily be controlled by the switch-on/off operation of the energy control switching element.

What is claimed is:

1. A feed forward converter type switching power supply apparatus, comprising:

a transformer having a primary coil, a secondary coil and a tertiary coil;

an input power source, an input capacitor and a main switching element connected to the primary coil of said transformer such that charge energy in the input capacitor is output as output energy from the secondary coil of said transformer when the main switching element turns on;

an energy storage circuit including a series connection of an energy control switching element and an inductance element connected between said input power source and said input capacitor, said energy storage circuit receiving energy from the input power source and storing the energy at the inductance element when the energy control switching element turns on;

an energy supply circuit for supplying the energy stored in the inductance element to the input capacitor when the main switching element and the energy control switching element turn off;

a voltage detection circuit for detecting, as a voltage proportional to a charging voltage across the input capacitor, a voltage induced at the tertiary coil of said transformer when said main switching element turns on;

a driving circuit for turning on the energy control switching element by the voltage induced by the tertiary coil of said transformer when said main switching element turns on; and an off-control circuit for turning off the energy control switching element through said driving circuit when the voltage detected by said voltage detection circuit is equal to or higher than a predetermined value.

2. A switching power supply apparatus according to claim 1, further comprising an excess current prevention circuit which detects an input current flowing from the input power source into said energy storage circuit when the main switching element turns on, and which stops the input current flowing from the input power source into said energy storage circuit by making said off-control circuit operate to stop the energy storing operation of said energy storage circuit during the time period in which the detected value of the input current is equal to or larger than a predetermined value.

3. A switching power supply apparatus according to claim 2, further comprising a noise filter circuit connected on the input side of said voltage detection circuit, for removing noise from the input capacitor charging voltage before said voltage is detected by said voltage detection circuit.

4. A switching power supply apparatus according to claim 3, wherein:

the input power source is connected to the input capacitor through the energy control switching element and the inductance element connected therebetween in this order in said energy storage circuit;

the on-off operation of said energy control switching element is controlled by the driving circuit which is supplied with power from said tertiary coil; and said off-control circuit turns off said energy control switching element by said driving circuit to stop the energy storing operation of said energy storage circuit during the time period in which the input capacitor charging voltage detected by said voltage detection circuit is equal to or larger than the predetermined value.

5. A switching power supply apparatus according to claim 2, wherein:

the input power source is connected to the input capacitor through the energy control switching element and the inductance element connected therebetween in this order in said energy storage circuit;

the on-off operation of said energy control switching element is controlled by the driving circuit which is supplied with power from said tertiary coil; and said off-control circuit turns off said energy control switching element by said driving circuit to stop the energy storing operation of said energy storage circuit during the time period in which the input capacitor charging voltage detected by said voltage detection circuit is equal to or larger than the predetermined value.

6. A switching power supply apparatus according to claim 1, further comprising a noise filter circuit connected on the input side of said voltage detection circuit, for removing noise from the input capacitor charging voltage before said voltage is detected by said voltage detection circuit.

7. A switching power supply apparatus according to claim 6, wherein:

the input power source is connected to the input capacitor through the energy control switching element and the inductance element connected therebetween in this order in said energy storage circuit;

the on-off operation of said energy control switching element is controlled by the driving circuit which is supplied with power from said tertiary coil; and said off-control circuit turns off said energy control switching element by said driving circuit to stop the energy storing operation of said energy storage circuit during the time period in which the input capacitor charging voltage detected by said voltage detection circuit is equal to or larger than the predetermined value.

8. A switching power supply apparatus according to claim 1, wherein:

the input power source is connected to the input capacitor through the energy control switching element and the inductance element connected therebetween in this order in said energy storage circuit;

the on-off operation of said energy control switching element is controlled by the driving circuit which is supplied with power from said tertiary coil; and said off-control circuit turns off said energy control stitching element by said driving circuit to stop the energy storing operation of said energy storage circuit during the time period in which the input capacitor charging voltage detected by said voltage detection circuit is equal to or larger than the predetermined value.

9. The switching power supply apparatus according to claim 1, wherein the energy supply circuit comprises a diode coupled in series with said inductance element whereby the series coupling of the inductance element and the diode are coupled in parallel to said input capacitor.

10. The switching power supply apparatus according to claim 1, wherein the voltage detection circuit comprises a diode, zener diode and a resistor coupled in series and coupled to the tertiary winding of the transformer and to the off-control circuit.

11. The switching power supply apparatus according to claim 1, wherein the driving circuit comprises a first switching element having a main terminal coupled in series with a diode to the tertiary winding, a control terminal of the first switching element being coupled to a resistor to the tertiary winding and another main terminal of the first switching element being coupled to the off-control circuit through a further resistor to the energy control switching element.

12. A switching power supply apparatus according to claim 1, wherein the off-control circuit comprises second, third and fourth switching elements, the second switching element having a control terminal coupled to said tertiary winding and having a main terminal coupled to the driving circuit, and having another main terminal coupled through a first diode to the tertiary winding, the third switching element having a main terminal coupled through a second diode to the control terminal of the second switching element and having another main terminal coupled to the tertiary winding, a control terminal of the third switching element being coupled to the voltage detection circuit, the fourth switching element having a resistor coupled between its control terminal and a first main terminal thereof, the control terminal thereof being connected to a main terminal of the third switching element, the first main terminal thereof being coupled through the second diode to the control terminal of the second switching element, a second main terminal of said fourth switching element being coupled to the control terminal of the third switching element and through a resistor to the tertiary winding.

* * * * *